United States Patent
Moon et al.

(10) Patent No.: US 7,231,268 B1
(45) Date of Patent: Jun. 12, 2007

(54) METHOD OF ASSIGNING AUDIO CHANNEL IDENTIFICATION, METHOD FOR SELECTING AUDIO CHANNEL USING THE SAME, AND OPTICAL RECORDING AND REPRODUCING APPARATUS SUITABLE THEREFOR

(75) Inventors: Seong-jin Moon, Seoul (KR); Young-nam Oh, Seongnam (KR); Tae-yun Chung, Kwacheon (KR); Jung-suk Kang, Seoul (KR); Pan-gie Park, Suwon (KR); Bong-kil Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/504,893

(22) Filed: Feb. 16, 2000

Related U.S. Application Data

(60) Provisional application No. 60/149,184, filed on Aug. 17, 1999.

(51) Int. Cl.
*G06F 17/00* (2006.01)
(52) U.S. Cl. .............................. 700/94; 725/43; 386/96
(58) Field of Classification Search ................ 700/94; 381/11–12, 56; 386/96–99, 125–126; 370/498, 370/486; 380/240; 348/484–485, 731, 462; 725/135, 118, 43
See application file for complete search history.

(56) References Cited

U.S. PATENT DOCUMENTS 5,130,816 A * 7/1992 Yoshio ........................ 358/341

(Continued)

FOREIGN PATENT DOCUMENTS

CN 1130787 A 9/1996

(Continued)

OTHER PUBLICATIONS

U.S. Appl. No. 09/504,958, filed Feb. 16, 2000, Seong-jin Moon et al., Samsung Electronics Co., Ltd.

(Continued)

*Primary Examiner*—Vivian Chin
*Assistant Examiner*—Lun-See Lao
(74) *Attorney, Agent, or Firm*—Stein, McEwen & Bui, LLP

(57) ABSTRACT

A method of assigning a channel identification (ID) of an audio signal by which it is possible to follow up and select the audio channel selected by a user even though a program or an audio data stream is changed in an audio/video (A/V) device for reproducing a program including a plurality of audio data streams, a method of selecting audio channels using the same, and an apparatus suitable therefor. The method of selecting the audio channels of an A/V data stream including a plurality of programs, each program including at least two kinds of audio data streams, each audio data stream including at least two sub-audio data streams which are not repeated and having a series of IDs according to a predetermined order of precedence, the method including (a) when a program is changed to another program, searching whether there is a sub-audio data stream having a channel ID which is the same as the channel ID assigned to the sub-audio data stream of the program which was being reproduced before the program was changed, in the changed program, and (b) when it is determined that there is the sub-audio data stream having a channel ID which is the same as the channel ID assigned to the sub-audio data stream of the program which was being reproduced before the program was changed in the step (a), selecting the sub-audio data stream. According to the method of selecting the audio channels, it is possible to follow up a voice mode selected by a user (maintain the previously selected audio channel) although a program or an audio data stream is changed.

10 Claims, 3 Drawing Sheets

U.S. PATENT DOCUMENTS

| | | | | |
|---|---|---|---|---|
| 5,652,824 | A | * | 7/1997 | Hirayama et al. ............. 386/95 |
| 5,686,954 | A | * | 11/1997 | Yoshinobu et al. ............ 725/43 |
| 5,701,384 | A | * | 12/1997 | Park .............................. 386/70 |
| 6,016,295 | A | * | 1/2000 | Endoh et al. ................... 369/49 |
| 6,028,979 | A | * | 2/2000 | Hirayama et al. ............. 386/95 |
| 6,108,584 | A | * | 8/2000 | Edwards ........................ 700/94 |
| 6,694,091 | B1 | * | 2/2004 | Moon et al. .................... 386/96 |
| 6,813,281 | B1 | * | 11/2004 | Moon et al. .................. 370/486 |

FOREIGN PATENT DOCUMENTS

| | | | |
|---|---|---|---|
| EP | 0521487 | * | 1/1992 |
| EP | 521 487 | | 1/1993 |
| EP | 626 689 | | 11/1994 |
| EP | 682 421 | | 11/1995 |
| EP | 0682421 | * | 11/1995 |
| EP | 0 727 780 A2 | | 8/1996 |
| EP | 727 780 | | 8/1996 |
| EP | 0 757 506 A2 | | 2/1997 |
| EP | 0 855 715 A2 | | 7/1998 |
| EP | 896 335 | | 2/1999 |
| EP | 897 178 | | 2/1999 |
| JP | 5-12831 | | 1/1993 |
| JP | 08-123451 | | 5/1996 |
| JP | 09-022577 | | 1/1997 |
| JP | 10-322623 | | 12/1998 |
| JP | 11-185389 | | 7/1999 |
| JP | 2001-197029 | | 7/2001 |
| JP | 2002-063780 | | 2/2002 |
| WO | WO 95/12276 | | 5/1995 |

OTHER PUBLICATIONS

U.S. Appl. No. 09/504,893, filed Feb. 16, 2000, Seong-jin Moon et al., Samsung Electronics Co., Ltd.

Office Action issued in Chinese Patent Application No. 02140732.0 on Sep. 9, 2005.

Patent Abstracts of Japan, "Transmission Reception System For Broadcast Signal And Its Device", Publication No. 08056204, Publication Date: Feb. 27, 1996, vol. 1996, No. 6, Jun. 28, 1996 & JP 08 056204 A (Toshiba Corp).

Patent Abstracts of Japan, "Muse Audio Changeover Circuit", Publication No. 10174019, Publication Date: Jun. 26, 1998, vol. 1998, No. 11, Sep. 30, 1998 & JP 10 174019 A (Fujitsu General Ltd).

U.S. Appl. No. 09/504,958, filed Feb. 16, 2000, Moon et al.

U.S. Appl. No. 09/504,959, filed Feb. 16, 2000, Moon et al.

* cited by examiner

INPUT OF MULTI-VOICE AUDIO SIGNAL

METHOD OF ASSIGNING AUDIO CHANNEL IDENTIFICATION, METHOD FOR SELECTING AUDIO CHANNEL USING THE SAME, AND OPTICAL RECORDING AND REPRODUCING APPARATUS SUITABLE THEREFOR

CROSS-REFERENCE TO RELATED APPLICATIONS

This application claims the benefit of U.S. Provisional Application No. 60/149,184, filed Aug. 17, 1999 in the U.S. Patent & Trademark Office and is based on Korean Application No. 98-31869, filed Aug. 5, 1998, in the Korean Patent Office, the disclosure of which is incorporated herein by reference.

BACKGROUND OF THE INVENTION

1. Field of the Invention

The present invention relates to a method of assigning an audio channel identification (ID) by which it is possible to follow up and select the audio channel selected by a user even when a program or an audio data stream is changed in an audio/video (A/V) device for reproducing a program including a plurality of audio data streams, a method of selecting an audio channel using the same, and an optical recording and reproducing apparatus suitable therefor.

2. Description of the Related Art

Currently, a moving picture expert group (MPEG) and AC3 are often used as methods for compressively encoding an audio signal. In a linear pulse code modulation (PCM), the audio signal is not compressively encoded but recorded as it is. In digital TV broadcasting or video CDS and digital video disks (DVDs) which are digital A/V devices, the MPEG format is mainly used.

When the encoded data streams of MPEG A/V data and other data streams are integrated and applied to a real application, it is necessary to make a data stream by integrating these data streams. Auxiliary data can be additionally used according to a certain application. The role of the MPEG system is synchronizing and multiplexing video and audio data.

In the MPEG system, multiplexing by packets is adopted. In the multiplexing by the packets, each of the video and audio data is divided into data streams called packets having an appropriate length, information such as headers are attached to the packets, and the packets of the video and audio data are multiplexed.

The packets include information for identifying whether the data items are video or audio data in a region called a packet header as shown in FIG. 1. The length of the packet depends on a transmission medium or application.

Table 1 is for showing the contents of the packet headers shown in FIG. 1.

TABLE 1

| Main items | |
| --- | --- |
| Packet_start_code_prefix | "00 00 01" h |
| stream_id | 1 byte, for distinguishing kinds of data items |
| PTS value | |
| (DTS value) | |
| Data | Video data, MPEG audio data or private data |

In Table 1, Packet_start_code_prefix represents the start of a packet and $stream_{13}$ id represents kinds of data items in a packet. For example, in the case of video data, stream_id is a binary code "1110 0000"b. In the case of audio data, stream_id is a binary code "1100 0*"b. Here, * shows that eight kinds of audio data streams can exist from 000b to 111b. In the MPEG system, other data items besides the two data items are classified as private streams. A code "1011 1101"b can be used for the private stream.

A presentation time stamp (PTS) and a decoding time stamp (DTS), defined in the MPEG system standard, respectively represent time taken to output and decode a presentation unit in the video or audio data. The presentation unit is a frame of a picture in the video data and a frame of audio in the audio data. The DTS is not necessary in the case of the audio data.

Except for MPEG audio data, audio data such as AC3 or LPCM is realized by private streams. The contents of the packet header adopted to the private streams is shown in Table 2.

TABLE 2

| Main items | |
| --- | --- |
| Packet_start_code_prefix | "00 00 01" h |
| stream_id | "1011 1101" b |
| PTS value | |
| substream_id | AC3 or LPCM |
| number_of_audio_channels | Number of audio channels |
| Data | |

In the Table 2, the substream_id is used in order to distinguish the kinds of audio data encoding such as AC3 or LPCM. For example, in the case of the AC3, the substream_id is "1010 0*"b. Here, * means that up to eight data streams can exist like in the MPEG audio. In the MPEG system, one program can have various video data streams and audio data streams.

The term "number_of_audio_channels" denotes the number of channels. There can be 1ch, 2ch, 3ch, 4ch, and a dual mono channel. Here, channels are different from channels selected by a user. Namely, the above channels appear as one channel to the user excluding the dual mono. The dual mono is recognized as two channels.

In an MPEG-1 or MPEG-2 program stream (PS), an upper layer of the video or audio packet, called a pack, exists. In general, a pack formed by integrating a plurality of packets is considered to be a basic unit. FIG. 2 shows the structure of the pack. Additional information for a time based reference for synchronous reproduction exists in a pack header.

Table 3 shows the contents of a pack header shown in FIG. 2.

TABLE 3

| Main items | |
| --- | --- |
| Pack_start_code | "00 00 01 BA" h |
| "01" | shows that data is MPEG-2 |
| SCR value | |
| program_mux_rate | |
| pack_stuffing_length | |

In the Table 3, the Pack_start_code is a code from which pack data starts. The SCR value represents the time at which the pack data reaches the buffer of a decoder and is used for synchronizing the system clock of an encoding port with the system clock of a decoding port. The program_mux_rate represents a transmission rate at which video, audio, and private data items are multiplexed and transmitted. In order to decode data correctly, the data must be transmitted at higher than the transmission rate. The pack_stuffing_length represents the number of dummy data.

FIG. 3 schematically shows channels and audio signals corresponding thereto. As shown in FIG. 3, audio signals are output through decoders. The data of the dual mono channel having outputs, the audio data of CH0 and the audio data of CH1 is similar to the 2ch data. However, the dual mono data is different from the 2ch data in that left and right audio signals are related to each other in the 2ch data, whereas CH0 and CH1 are separate audio signals in the dual mono data.

For example, Korean language audio data can be loaded into CH0 and English language audio data can be loaded into CH1 in the dual mono channel. Therefore, in general, only one of the two channels is output or the CH0 audio data and the CH1 audio data are output through a left speaker and a right speaker, respectively.

FIG. 4 shows an example of an apparatus for decoding and outputting the data of the dual mono channel. When a select signal is 0, the apparatus shown in FIG. 4 outputs CH0 audio as left audio and right audio. When the select signal is 1, the apparatus outputs CH1 audio as left audio and right audio. When the select signal is 2, the apparatus outputs CH0 audio and CH1 audio as left audio and right audio, respectively.

FIG. 5 schematically shows a method of recording or reproducing a multi voice audio signal as dual mono audio data. The multi voice audio signal is formed of main audio data and sub-audio data. When data is recorded, the main audio data and the sub-audio data are encoded into an audio data stream through a multi-voice encoder. At this time, the main audio data is encoded into the CH0 audio data and the sub-audio data is encoded into the CH1 audio data.

When data is reproduced, an audio data stream is decoded into the CH0 audio data and the CH1 audio data through a multi-voice decoder. The CH0 audio data is main audio data and the CH1 audio data is sub-audio data.

Here, it is assumed that a plurality of audio data streams exist. As an example, when two audio data streams exist in an A/V data stream, the user can select one among the two channels. When the selected audio data stream is dual mono data, that is, sub-audio data streams are included, the user can select two channels.

SUMMARY OF THE INVENTION

It is an object of the present invention to provide a method of assigning a channel identification (ID) to a sub-audio data stream included in an audio data stream when each audio data stream is in a dual mode in an audio/video (A/V) stream including a plurality of audio data streams.

It is another object of the present invention to provide a method of selecting the same kind of audio channel by following up the audio channel selection input of a user although a program or an audio data stream is changed in an A/V device for reproducing a plurality of audio data streams which allow a dual mono mode.

It is still another object of the present invention to provide an apparatus suitable for the above methods of selecting audio channels.

Additional objects and advantages of the invention will be set forth in part in the description which follows and, in part, will be obvious from the description, or may be learned by practice of the invention.

Accordingly, to achieve the first and other objects of the present invention, there is provided a method of assigning audio channel IDs, wherein channel IDs 2n-1 (n is the order of precedence of audio data streams, 1, 2, 3, . . . ) are assigned to audio data streams in an audio/video (A/V) data stream including at least two kinds of audio data streams, each of which is in a dual mono mode.

To achieve the second and other objects of the present invention, there is provided a method of selecting audio channels of an A/V data stream comprising a plurality of programs, each program comprising at least two kinds of audio data streams, each audio data stream comprising at least two sub-audio data streams which are not repeated and have a series of IDs according to a predetermined order of precedence, comprising the steps of when a program is changed to another program, searching whether there is a sub-audio data stream having a channel ID which is the same as the channel ID assigned to the sub-audio data stream of the program which was being reproduced before the program was changed, in the changed program and when there is the sub-audio data stream having the channel ID which is the same as the channel ID assigned to the sub-audio data stream of the program which was being reproduced before the program was changed, selecting the sub-audio data stream.

To achieve the third and other objects of the present invention, there is provided an optical recording and reproducing apparatus, comprising a pick-up unit to pick up an optical signal from a disk, an RF AMP to convert an optical signal generated by the pick-up unit into an electrical signal and extracting a servo signal and modulated data, a digital signal processor to output a compressed A/V data stream by demodulating the modulated data provided by the RF AMP, a servo unit to receive information from the RF AMP required for controlling a servo and the system controller and to perform a servo operation, an AV codec to decode the compressed A/V data stream provided by the digital signal processor and to output an A/V data stream including a plurality of audio data streams, a key input unit to input the key input of a user, and a system controller to perform user interfacing through the key input unit and to control the pick-up unit, the RF AMP, the digital signal processor, and the AV codec, wherein the system controller searches whether there is a sub-audio data stream having the same channel ID as the channel ID assigned to the sub-audio data stream of the program which was reproduced before the program was changed in the changed program when one program is changed to another program and selects the sub-audio data stream having the same channel ID as the channel ID assigned to the sub-audio data stream of the program which was reproduced before the program was changed in the changed program.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
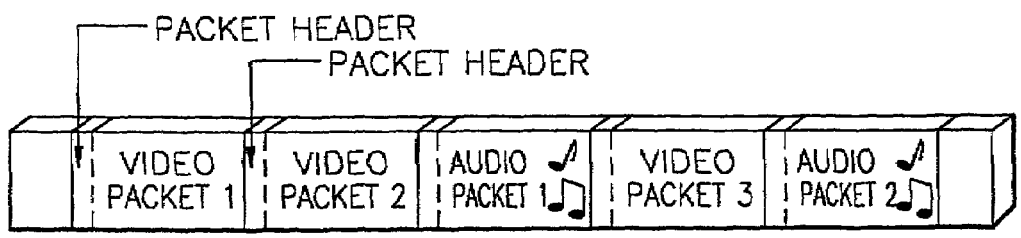
FIG. 1 shows the structure of packets in an MPEG system.
Figure 2:
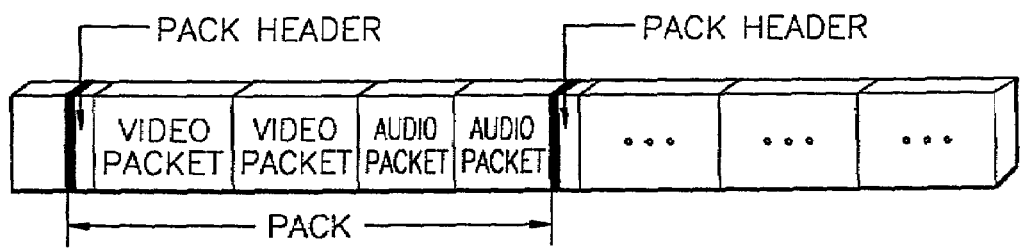
FIG. 2 shows the structure of a pack in the MPEG system.
Figure 3:
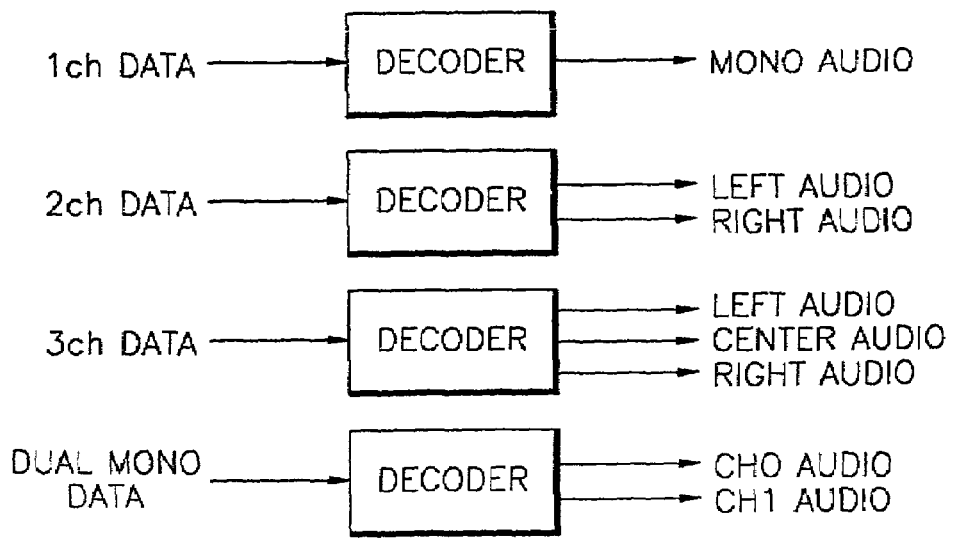
FIG. 3 shows audio signals in each channel of audio data.
Figure 4:
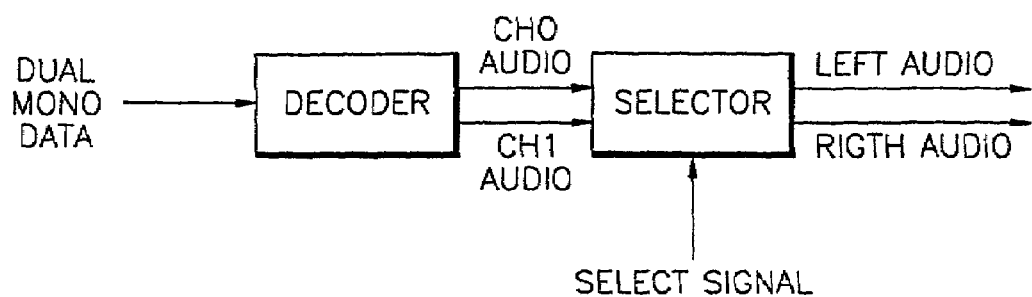
FIG. 4 shows an example of an apparatus for decoding and outputting the data of a dual mono channel.
Figure 5:
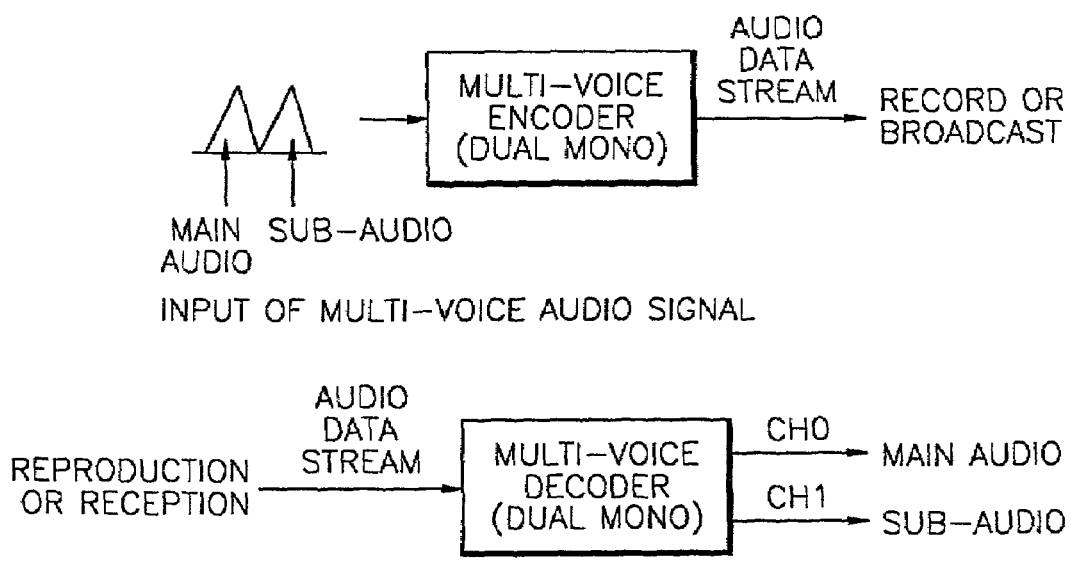
FIG. 5 schematically shows a method of recording and reproducing a multi voice audio signal as dual mono audio data.

These and other objects and advantages of the invention will become apparent and more readily appreciated from the following description of the preferred embodiments, taken in conjunction with the accompanying drawings of which:

In a method of assigning an audio channel identification (ID) according to an embodiment of the present invention, a separate channel ID is assigned to each audio channel included in a program.

Table 4 shows examples of channel IDs assigned to data streams when three audio data streams are recorded on one program.

TABLE 4

|  | Non dual mono | Dual mono | |
| --- | --- | --- | --- |
|  | Channel ID |  | Channel ID |
| Data stream 1 | 1 | CH0 | 1 |
|  |  | CH1 | 2 |
| Data stream 2 | 3 | CH0 | 3 |
|  |  | CH1 | 4 |
| Data stream 3 | 5 | CH0 | 5 |
|  |  | CH1 | 6 |

In other cases excluding the dual mono case, channel IDs such as 2n−1 (n=1, 2, and 3) are given. At this time, n is the same as a data stream number. In the case of dual mono, channel IDs 2n−1 are given to CH0 data and channel IDs of 2n are given to CH1 data.

When the user presses an audio change key through an apparatus such as a remote controller, numbers larger than the currently reproduced channel ID are sequentially selected and output. When the user selects a channel ID, the audio data stream corresponding to the channel ID is selected, decoded, and output.

In the audio channel selecting method according to the present invention, when a program is changed, the audio channel selected in a previous program is followed up and selected in a next program. Also, when there is no audio channel before changing the program, a default audio channel is selected.

Here, it is assumed that a new data stream is input when data is reproduced. Audio data different from that of a previous data stream may be recorded in the new data stream. For example, while one audio data stream, which is dual mono, is being recorded in the previous data stream, two data streams which are not dual mono are recorded in the new data stream.

In the audio channel selecting method according to the present invention, when data corresponding to a channel ID which is to be reproduced exists, the data is selected and reproduced. When there is no corresponding data, by default, the data corresponding to the channel ID−1 is selected and output.

When there is data corresponding to the channel ID which is being reproduced, the data is selected and reproduced. When there is no corresponding data, the current channel ID−1 is searched when the current channel is evenly numbered. When data corresponding to the channel ID−1 exists, the data is selected and output. When the data does not exist, the data corresponding to the channel ID 1 is selected and output. When there is no corresponding data and the current channel is oddly numbered, the data corresponding to the channel ID 1 is selected and output.

When the program is changed again, if there is data corresponding to the channel ID, the data of the channel ID of the new program is automatically selected and output even if there were no data in the channel ID of the previous program.

Table 5 shows another example of combinations of audio data streams.

TABLE 5

| Program 1 | | Program 2 | |
| --- | --- | --- | --- |
| Data stream 1 (dual mono) | CH0; channel ID 1 CH1; channel ID 2 | Data stream 1 (non dual mono) | Channel ID 1 |
| Data stream 2 (dual mono) | CH0; channel ID 3 CH1; channel ID 4 | Data stream 2 (non dual mono) | Channel ID 3 |

For example, when the user presses an audio changing key during the reproduction of program 1, an output audio signal is changed in the order of CH0 of the data stream number 1, CH1 of the data stream number 1, CH0 of the data stream number 2, and CH1 of the data stream number 2.

When program 1 is reproduced by selecting CH0 of the data stream 2 whose channel ID is 3 and it is desired that the next program 2 be reproduced, it is investigated whether data of the channel ID 3 exists. Since the data stream 2 corresponding to the channel ID 3 exists in program 2, the data stream 2 is reproduced.

When the program 1 is reproduced by selecting CH1 of the data stream 2 whose channel ID is 4 and it is desired that the next program be reproduced, it is investigated whether the data of the channel ID 4 exists. Since there is no data corresponding to the channel ID 4 in the program 2, the data stream 1 whose channel ID is 1, which is the default channel, is selected and reproduced.

In another preferable method of changing channels, it is investigated whether there is a channel ID 3 obtained by subtracting 1 from a channel ID 4. When the channel ID exists, the channel ID is selected. In the immediately above embodiment, when the channel ID does not exist, the data stream 1 whose channel ID is 1 may be selected and reproduced. However, in this embodiment, since the data of the channel ID 3 exists, the data of the channel ID 3 is reproduced (by subtracting 1 from the channel ID 4).

According to the present invention, when the channel ID is oddly numbered, the channel is the main audio channel in non dual mono or dual mono. When the channel ID is evenly numbered, the channel is a sub-audio channel in dual mono.

According to the audio channel selecting of the present invention, when an audio changing key is received, the change from main audio to sub-audio is performed in the corresponding audio data stream and a change to the next audio data stream is performed.

When the user selects one audio channel, the currently selected channel is maintained even when the program is changed, if possible.

However, when there is no corresponding audio channel, the channel must be changed to an appropriate channel and the changed channel must be selected. At this time, CH0, which is the default channel, is selected and reproduced or the channel closest to the currently selected audio channel is searched for and then reproduced (when the channel ID is evenly numbered, namely, in the case of the sub-audio data, the main audio channel can be considered to be the closest channel, which is the oddly numbered channel ID-1).

Also, when there is no audio data stream corresponding to the currently set channel ID, the channel ID is stored and a basic channel is selected and output by the above-mentioned method or the closest channel is selected and reproduced, and when the audio data stream corresponding to the above channel ID appears, the data is selected and output.

This is done in case the user selects and reproduces a sub-audio channel, then selects and reproduces another program which does not have sub-audio for a short time, and selects and reproduces the original sub-audio when the program with the sub-audio is reproduced. By not doing so, the user must perform changing in order to reproduce the sub-audio.

For example, Table 6 shows a Program 3 combined after a Program 2 of Table 5.

TABLE 6

| Program 1 | | Program 2 | | Program 3 | |
|---|---|---|---|---|---|
| Data stream 1 (dual mono) | CH0; channel ID 1 CH1; channel ID 2 | Data stream 1 (non dual mono) | Channel ID 1 | Data stream 1 (dual mono) | CH0; channel ID 1 CH1; channel ID 2 |
| Data stream 2 (dual mono) | CH0; channel ID 3 CH1; channel ID 4 | Data stream 2 (non dual mono) | Channel ID 3 | Data stream 2 (dual mono) | CH0; channel ID 3 CH1; channel ID 4 |

If the channel ID 4 was originally selected by a user in recording or reproducing program 1, and then the new program 2 is selected, the channel ID 3 (which is data stream 2) of the Program 2 is selected. Then, when the new program 3 is selected after program 2, the channel ID 4 (which is CH1) of the program 3 is selected, thereby automatically returning to the original channel ID 4.

Figure 6:
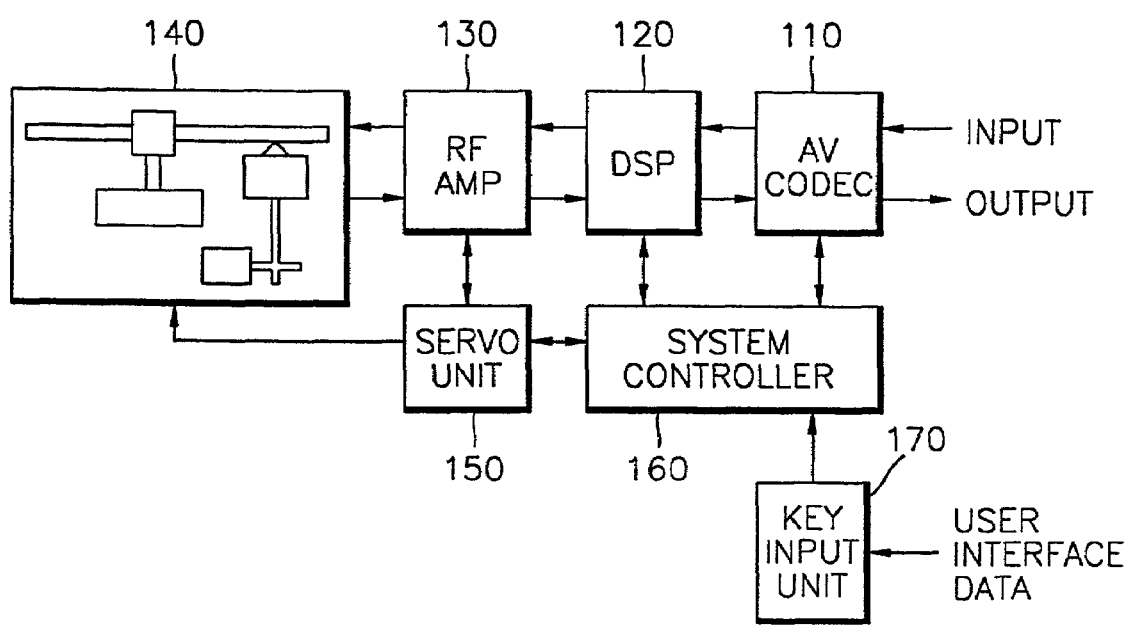
FIG. 6 is a block diagram showing a structure of an optical recording and reproducing apparatus according to an embodiment of the present invention.

FIG. 6 is a block diagram of an optical recording and reproducing apparatus suitable for the present invention. A/V data is recorded and reproduced using a recordable disk. The function of the optical recording and reproducing apparatus can be divided into recording and reproducing.

During the recording of data, an AV codec 110 compressively encodes an A/V signal received from the outside by a predetermined compression scheme and provides information on the magnitude of the compressed data. A digital signal processor (DSP) 120 receives the A/V data supplied from the AV codec 110, assigns additional data for processing an error correction code (ECC), and performs modulation by a predetermined modulation scheme. A high frequency amplifier (RF AMP) 130 converts electrical data provided by the DSP 120 into an optical signal.

A pick-up unit 140 includes an actuator for recording the optical signal from the RF AMP 130 on the disk and performing focusing and tracking. A servo unit 150 receives information required for controlling a servo from the RF AMP 130 and a system controller 160, and controls the servo.

The system controller 160 controls the entire system, determines the encoding mode of audio data, records data on the disk, and controls the data.

During the reproduction of data, the pick-up unit 140 picks up an optical signal from the disk on which data is stored. Data is extracted from the optical signal. The RF AMP 130 converts the optical signal from the pick-up unit 140 into an electrical signal and extracts a servo signal for controlling the servo and modulated data.

The DSP 120 demodulates the modulated data of the electrical signal provided by the RF AMP 130 corresponding to the modulation scheme used for modulating the data and removes additional data by performing the ECC, to output compressed A/V data. The servo unit 150 receives information required for controlling the servo from the RF AMP 130 and the system controller 160 and performs the servo operation.

The AV codec 110 decodes the compressed A/V data provided by the DSP 120 and outputs an A/V signal.

The system controller 160 performs user interfacing, for example, it processes a key input of the user, controls the pick-up unit 140, the RF AMP 130, the DSP 120, and the AV codec 110 by the above method, and analyzes an audio data stream and controls the pick-up portion 140, the RF AMP 130, the DSP 120, and the AV codec 110 so as to select and reproduce corresponding audio data when a command for changing the audio channel is received from a key input unit 170. The system controller also assigns the channel IDs.

As mentioned above, according to the channel ID assigning method of the present invention, it is possible to follow up the same channel when an audio signal is selected by assigning different channel IDs to the channels of the audio data streams.

According to the audio channel selecting methods of the present invention, it is possible to follow up the audio mode selected by a user even when a program or an audio data stream is changed.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of selecting audio channels of an A/V data stream comprising a plurality of programs, each program comprising at least two kinds of audio data streams, each audio data stream comprising at least two sub-audio data streams which are not repeated and have a series of channel IDs according to a predetermined order of precedence, the method comprising:

(a) when one of the programs is changed to another one of the programs during reproduction, searching whether there is a sub-audio data stream having a channel ID which is the same as a user selected channel ID assigned to the sub-audio data stream of the program which was being reproduced before the program was changed, in the another program; and (b) when there is the sub-audio data stream having a channel ID which is the same as the user selected channel ID assigned to the sub-audio data stream of the program which was being reproduced before the program was changed, selecting the sub-audio data stream having the same channel ID of the another program.

2. The method as claimed in claim 1, wherein, when there is no sub-audio data stream having a channel ID which is the same as the channel ID assigned to the sub-audio data stream of the program which was being reproduced before being changed, selecting a sub-audio data stream having a channel selection number which has first precedence in the predetermined order of precedence among the sub-audio data streams of the another program.

3. The method as claimed in claim 1, wherein, when there is no sub-audio data stream having a channel ID which is the same as the channel ID assigned to the sub-audio data stream of the program which was being reproduced before being changed, the method further comprises:

searching among the sub-audio data streams of the another program for whether there is a sub-audio data stream having a different channel ID which is the channel ID assigned to the sub-audio data stream of the program which was reproduced before the program was changed decreased by 1; and when the sub-audio data stream having the different channel ID exists in the another program, selecting, from the sub-audio data streams of the another program, the sub-audio data stream having the different channel ID which is the channel ID assigned to the sub-audio data stream of the program which was reproduced before the program was changed decreased by 1.

4. A method of selecting audio channels of an A/V data stream comprising a plurality of programs, each program comprising at least two audio data streams with at least one channel, ones of the audio data streams having dual mono channels, wherein each channel has a channel ID according to a predetermined order of precedence within the program, the method comprising:

when a first one of the programs is changed to a second one of the programs, searching whether there is a second dual mono channel of the second program having a channel ID which is the same as a channel ID assigned to a first dual mono channel selected by a user of the first program which was being reproduced prior to the change; and selecting the second dual mono channel of the second program if the search is successful.

5. The method as claimed in claim 4, further comprising:
   selecting one channel of the second program having a channel selection number with a higher order of precedence than the first dual mono channel if the search is unsuccessful.

6. The method as claimed in claim 4, further comprising:
   selecting one channel of the second program having a channel selection number closest in correspondence to the first dual mono channel if the search is unsuccessful.

7. The method as claimed in claim 4, further comprising:
   selecting a default one of the channels of the second program if the search is unsuccessful.

8. A method of selecting audio channels of an A/V data stream comprising a plurality of programs, each program comprising at least two kinds of audio data streams, each audio data stream comprising at least two sub-audio data streams which have a series of channel IDs, the method comprising:

determining if a first program is changed to a second program during reproduction;

when the first program is changed to the second program, searching, in the second program, whether there is a sub-audio data stream having a channel ID which is the same as a user selected channel ID assigned to the sub-audio data stream of the first program; and when there is the sub-audio data stream having a channel ID which is the same as the user selected channel ID assigned to the sub-audio data stream of the first program, selecting the sub-audio data stream having the same channel ID of the second program.

9. The method as claimed in claim 8, wherein, when there is no sub-audio data stream having a channel ID which is the same as the channel ID assigned to the sub-audio data stream of the first program, selecting a sub-audio data stream having a channel selection number which has first precedence in a predetermined order of precedence among the sub-audio data streams of the second program.

10. The method as claimed in claim 8, wherein, when there is no sub-audio data stream having a channel ID which is the same as the channel ID assigned to the sub-audio data stream of the first program, the method further comprises:

searching among the sub-audio data streams of the second program for whether there is a sub-audio data stream having a channel ID which has a higher precedence than the precedence of the channel ID assigned to the sub-audio data stream of the first program; and when the sub-audio data stream having the channel ID which has the higher precedence than the precedence of the channel ID assigned to the sub-audio data stream of the first program, selecting, from the sub-audio data streams of the second program, the sub-audio data stream having the channel ID which has the higher precedence than the precedence of the channel ID assigned to the sub-audio data stream of the first program.

* * * * *